(12) United States Patent
Blair

(10) Patent No.: US 9,542,787 B2
(45) Date of Patent: Jan. 10, 2017

(54) SYSTEMS AND METHODS FOR DETECTING A DOCUMENT ATTRIBUTE USING ACOUSTICS

(71) Applicant: De La Rue North America Inc., Irving, TX (US)

(72) Inventor: Bruce Blair, Flower Mound, TX (US)

(73) Assignee: De La Rue North America Inc., Irving, TX (US)

( * ) Notice: Subject to any disclaimer, the term of this patent is extended or adjusted under 35 U.S.C. 154(b) by 572 days.

(21) Appl. No.: 13/834,128

(22) Filed: Mar. 15, 2013

(65) Prior Publication Data

US 2014/0269205 A1  Sep. 18, 2014

(51) Int. Cl.
*G07D 7/00* (2016.01)
*G07D 7/08* (2006.01)
*G01H 3/00* (2006.01)

(52) U.S. Cl.
CPC . *G07D 7/08* (2013.01); *G01H 3/00* (2013.01)

(58) Field of Classification Search
CPC .............. G01S 15/04; G07D 7/08; G01H 3/00
USPC ............................................... 367/93; 73/598
See application file for complete search history.

(56) References Cited

U.S. PATENT DOCUMENTS

| 5,852,232 | A | 12/1998 | Samsavar et al. |
| 6,289,729 | B1 * | 9/2001 | Haque et al. .................. 73/159 |
| 6,745,628 | B2 | 6/2004 | Wunderer |
| 7,362,423 | B2 | 4/2008 | Masten |
| 7,469,589 | B2 | 12/2008 | Pradel |
| 7,748,274 | B2 | 7/2010 | Pellaton et al. |
| 8,199,608 | B2 | 6/2012 | Piel et al. |
| 8,201,453 | B2 | 6/2012 | Kondo |
| 8,368,879 | B2 | 2/2013 | Kayani |
| 8,421,046 | B2 | 4/2013 | Leuthold |
| 8,510,062 | B2 | 8/2013 | Domke et al. |

(Continued)

FOREIGN PATENT DOCUMENTS

| JP | 2009-098098 A | 5/2009 |
| KR | 10-2008-0094426 A | 10/2008 |

(Continued)

OTHER PUBLICATIONS

International Search Report and Written Opinion received in Patent Cooperation Treaty Application No. PCT/US2014/021437, dated Jun. 24, 2014, 12 pages.

(Continued)

*Primary Examiner* — Luke Ratcliffe
*Assistant Examiner* — Hovhannes Baghdasaryan
(74) *Attorney, Agent, or Firm* — Hubbard Johnston, PLLC

(57) ABSTRACT

Systems and methods for detecting a document attribute using acoustics are provided. In one embodiment, a method for detecting a feature of a document using acoustics includes emitting a first acoustic signal from a first acoustic transmitter to a first acoustic receiver while a document is between the first acoustic transmitter and the first acoustic receiver, and emitting a second acoustic signal from a second acoustic transmitter to a second acoustic receiver while the document is between the second acoustic transmitter and the second acoustic receiver. The second acoustic signal differs from the first acoustic signal. The method also includes determining the presence of a feature of the document using at least one of the first acoustic signal or the second acoustic signal.

15 Claims, 7 Drawing Sheets

(56) References Cited

U.S. PATENT DOCUMENTS

| | | | |
|---|---|---|---|
| 8,695,646 B2 | 4/2014 | Agam et al. | |
| 2002/0079644 A1 | 6/2002 | Phinney | |
| 2003/0025512 A1 | 2/2003 | Wunderer | |
| 2003/0142587 A1* | 7/2003 | Zeitzew | G01S 7/52004 367/127 |
| 2004/0150155 A1* | 8/2004 | Okitsu et al. | 271/262 |
| 2006/0145412 A1 | 7/2006 | Tagawa et al. | |
| 2008/0289422 A1* | 11/2008 | Haque et al. | 73/599 |
| 2009/0323473 A1* | 12/2009 | Tsurugaya et al. | 367/100 |
| 2010/0073711 A1* | 3/2010 | Pellaton et al. | 358/1.15 |
| 2011/0141283 A1* | 6/2011 | Lee et al. | 348/152 |
| 2011/0261653 A1* | 10/2011 | Tsurugaya et al. | 367/100 |
| 2012/0134238 A1* | 5/2012 | Surprenant | H04S 1/007 367/137 |
| 2014/0269205 A1 | 9/2014 | Blair | |
| 2015/0235500 A1 | 8/2015 | Kim | |

FOREIGN PATENT DOCUMENTS

| | | |
|---|---|---|
| KR | 10-2010-0023251 A | 3/2010 |
| KR | 10-1181434 B1 | 9/2012 |

OTHER PUBLICATIONS

Supplemental European Search Report received in European Application No. 14770664.2, dated Sep. 16, 2016, 7 pages.

\* cited by examiner

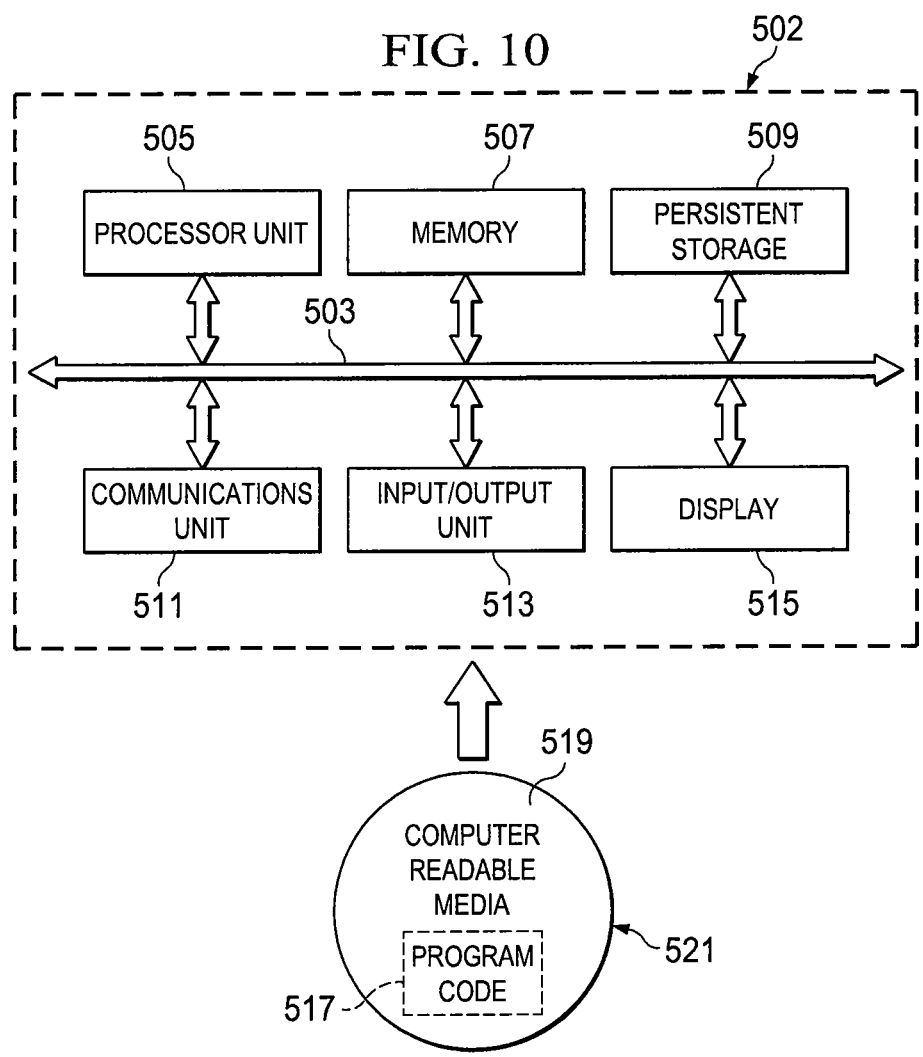

SYSTEMS AND METHODS FOR DETECTING A DOCUMENT ATTRIBUTE USING ACOUSTICS

TECHNICAL FIELD

The illustrative embodiments relate generally to document attribute detection, and more particularly, to systems and methods for detecting a document attribute using acoustics.

BACKGROUND

As documents have become more sophisticated, so have the techniques by which document features, or attributes, may be detected or authenticated. Even in the case of simple or traditional documents, advances have been made in the field of document feature detection or authentication. For example, acoustic technology may be suitable for detecting or analyzing certain features of a document. However, current acoustic techniques for detecting document features may suffer from poor signal-to-noise ratios, undesirable acoustic signal reflection, low resolution, or other issues.

SUMMARY

According to an illustrative embodiment, a method for detecting a feature of a document using acoustics includes emitting a first acoustic signal from a first acoustic transmitter to a first acoustic receiver while a document is between the first acoustic transmitter and the first acoustic receiver, and emitting a second acoustic signal from a second acoustic transmitter to a second acoustic receiver while the document is between the second acoustic transmitter and the second acoustic receiver. The second acoustic signal differs from the first acoustic signal. The method also includes determining the presence of a feature of the document using at least one of the first acoustic signal or the second acoustic signal.

According to another illustrative embodiment, a method for detecting a feature of a document using acoustics includes emitting acoustic signals from a plurality of acoustic transmitters. Each of the plurality of acoustic transmitters emits a respective acoustic signal. At least two of the respective acoustic signals differs from one another. The method also includes receiving the acoustic signals at a plurality of acoustic receivers such that each of the plurality of acoustic receivers receives at least one of the respective acoustic signals. The plurality of acoustic receivers receives the acoustic signals while a document is between the plurality of acoustic transmitters and the plurality of acoustic receivers. The method also includes determining the presence of a feature of the document using the acoustic signals received by the plurality of acoustic receivers.

According to another illustrative embodiment, an apparatus for detecting a feature of a document using acoustics includes a plurality of acoustic transmitters to emit acoustic signals through a document. Each of the plurality of acoustic transmitters emits a unique acoustic signal. The document has a first side and a second side. The plurality of acoustic transmitters is positioned to face the first side of the document. The apparatus also includes a plurality of acoustic receivers facing the second side of the document. The plurality of acoustic receivers is adapted to receive the acoustic signals emitted through the document from the plurality of acoustic transmitters. The apparatus also includes an acoustic signal processor to determine the presence of a feature of the document using the acoustic signals received by the plurality of acoustic receivers.

BRIEF DESCRIPTION OF THE DRAWINGS

FIG. 10 is a schematic, block diagram of a data processing system in which the illustrative embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

Figure 1:
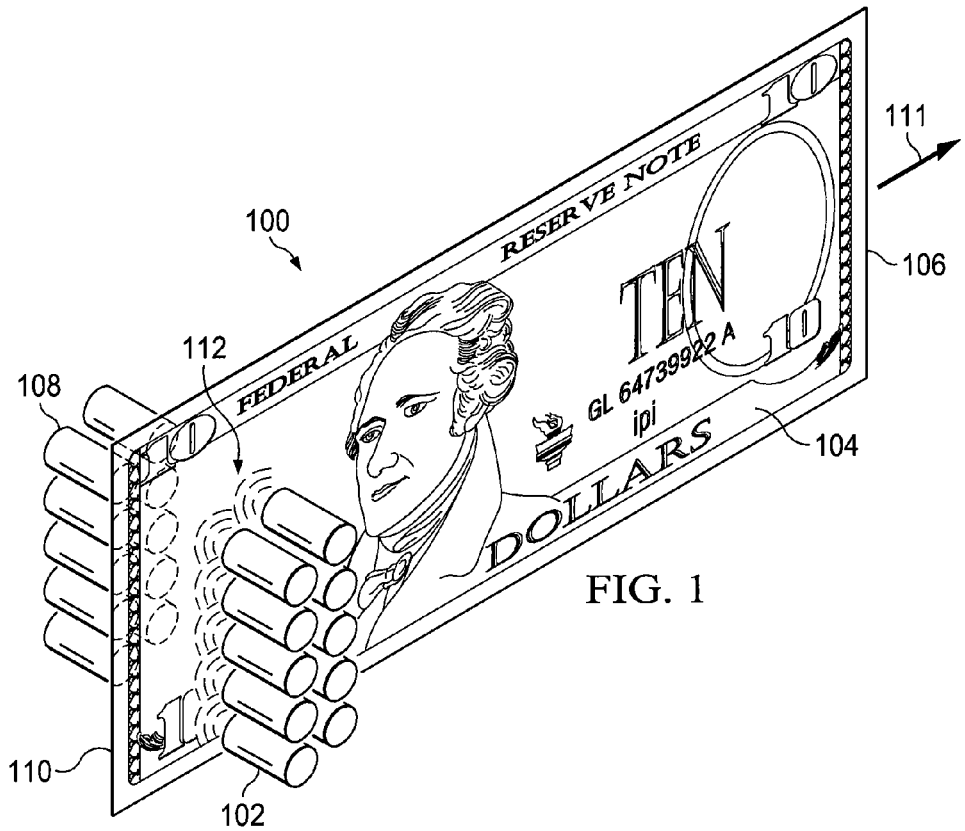
FIG. 1 is a schematic, pictorial representation of a document moving past an array of acoustic transmitters and acoustic receivers according to an illustrative embodiment.
Figure 2:
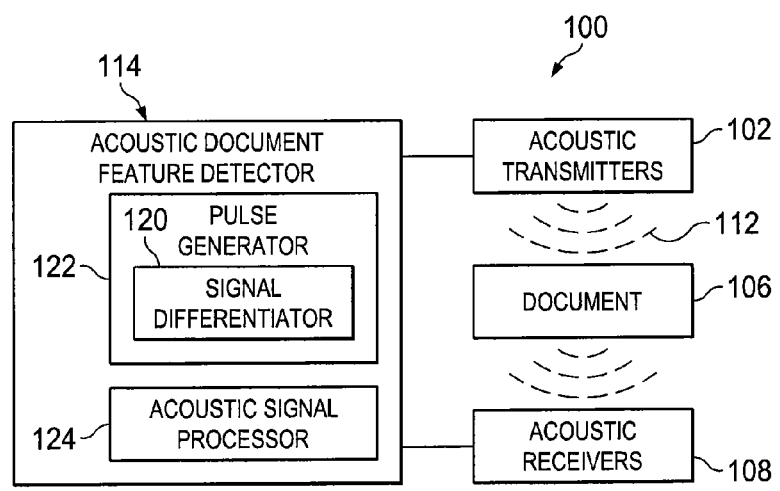
FIG. 2 is a schematic, block diagram of an acoustic document feature detection system according to an illustrative embodiment.
Figure 3:
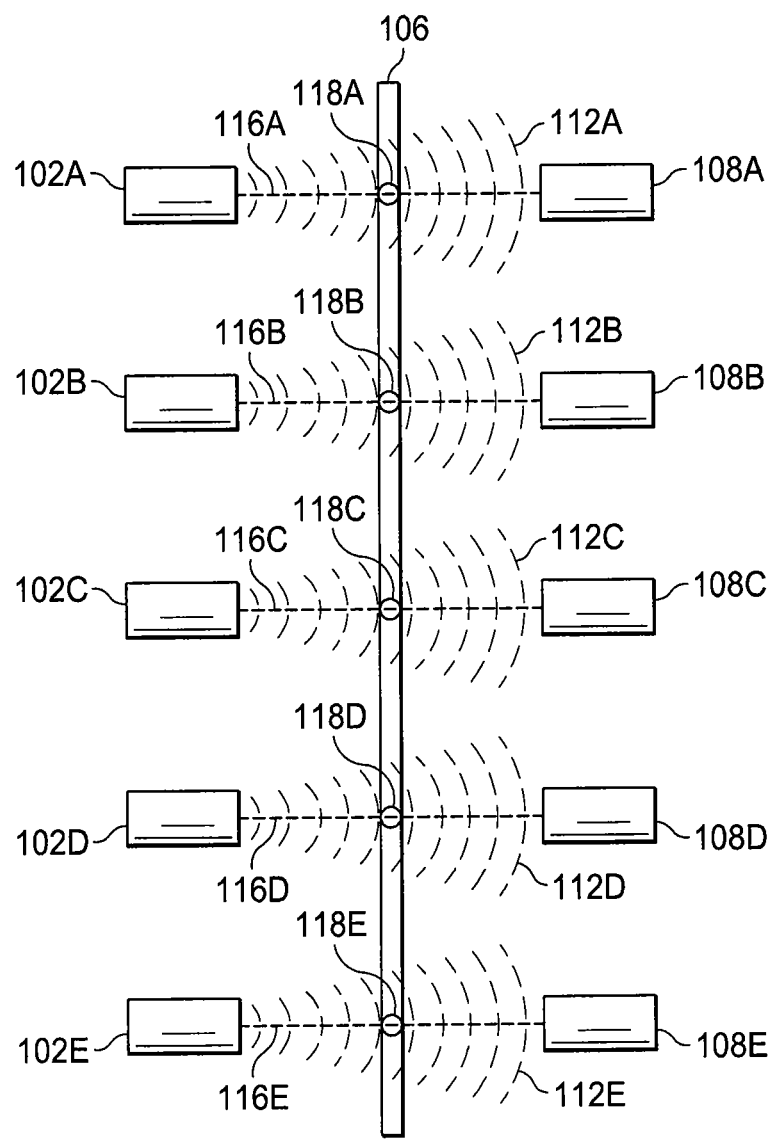
FIG. 3 is a schematic, side view of a set of acoustic transmitters and receivers detecting features of a document along orthogonal lines of sight according to an illustrative embodiment.
Figure 4:
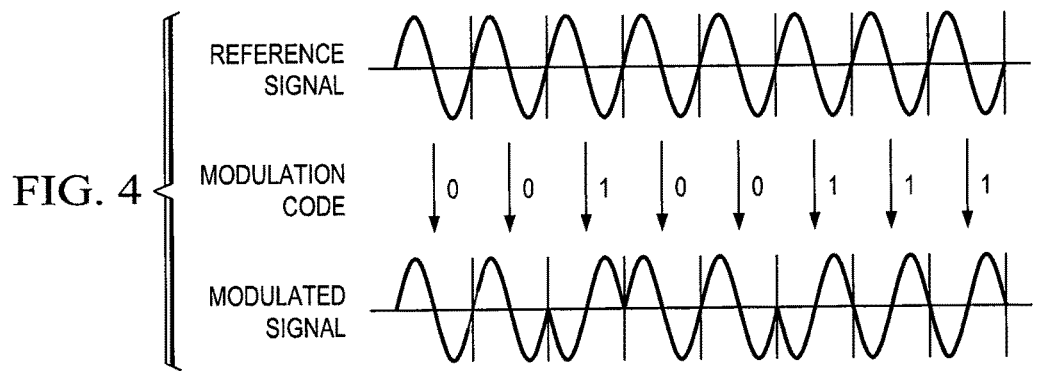
FIG. 4 is a schematic chart showing signal modulation according to an illustrative embodiment.

Referring to FIGS. 1 through 4, an illustrative embodiment of an acoustic document feature detection system 100 includes one or more acoustic transmitters 102 positioned to face a first side 104 of a document 106, and one or more acoustic receivers 108 positioned to face a second side 110 of the document 106. As the document 106 moves in a direction of travel 111 between the acoustic transmitters 102 and the acoustic receivers 108, each of the acoustic transmitters 102 emits one or more acoustic signals 112 through the document 106. As explained in more detail below, two or more of the acoustic transmitters 102 may each emit a unique acoustic signal through the document 106, allowing for the acoustic document feature detection system 100 to discriminate between acoustic signals emitted by each of the acoustic transmitters 102. Indeed, in one embodiment, each respective acoustic signal emitted by the acoustic transmitters 102 differs from one another so that the source and/or path of each of the respective acoustic signals is determinable for further processing. Unless otherwise indicated, as used herein, "or" does not require mutual exclusivity. It will be appreciated that while FIG. 1 illustrates two banks, or columns, of acoustic transmitters 102 and receivers 108, any number of banks or columns may be used (e.g., one, three, five, etc.).

After the acoustic receivers 108 receive the acoustic signals 112 that have passed through the document 106, the acoustic document feature detection system 100 may determine the presence of a feature of the document 106 based on one or more of the acoustic signals 112 received from the acoustic transmitters 102. For example, the acoustic document feature detection system 100 may determine the presence of tape (e.g., clear tape, opaque tape, etc.) or a tear (e.g., an open tear, a closed tear, etc.), among other things.

In one example, the document 106 may be a banknote from any country of origin. Other types of documents 106 with which the acoustic document feature detection system 100 may be used include financial documents (e.g., checks, money orders, travelers' checks, etc.), legal-related documents, passports, or any other type of document.

In one embodiment, an acoustic document feature detector 114, implementable by any data processing system, may cause the acoustic transmitters 102 to emit acoustic signals 112 toward the document 106. With particular reference to the side view of FIG. 3, in which the document 106 moves into or out of the page, each of the acoustic transmitters 102A-E emits a respective acoustic signal 102A-E toward the document 106 along a respective line of sight 116A-E. Each of the acoustic transmitters 102A-E may be paired with a respective acoustic receiver 108A-E. Each pair of acoustic transmitters and receivers 102A-108A, 102B-108B, 102C-108C, 102D-108D, and 102E-108E, may face one another along a respective line of sight 116A-E that is substantially orthogonal, or perpendicular, to the plane of the document 106. Each acoustic signal 112A-E may also be transmitted along these respective lines of sight 116A-E. In an alternate embodiment, the acoustic transmitters 102 and acoustic receivers 108 need not be paired with one another in this manner, and the number of acoustic transmitters 102 and acoustic receivers 108 need not be the same.

In one embodiment, the presence of one or more document features may be determined at portions 118A-E of the document 106 at which the lines of sight 116A-E intersect, or traverse, the document 106. For example, the presence of a tear or hole in the document 106 may be tested at the portions 118A-E of the document 106 located substantially along the lines of sight 116A-E. As will be described in more detail in FIGS. 6 and 7, additional or non-orthogonal lines of sight may also be utilized by the acoustic document feature detector 114 to increase the number of portions, or area, of the document 106 at which features are detected by allowing the receivers 108A-E to receive and process acoustic signals from non-paired acoustic transmitters.

In one embodiment, two or more of the acoustic transmitters 102A-E may emit acoustic signals 112 that differ from one another. In another embodiment, each of the acoustic signals 112A-E may differ from one another. Differing the acoustic signals 112A-E in this manner allows the acoustic document feature detector 114 to extract particular or desired acoustic signals received at each acoustic receiver 108. For example, the acoustic receiver 108A may receive acoustic signals 112A and 112B from the acoustic transmitters 102A and 102B, respectively. However, the acoustic document feature detector 114 may be interested only in the acoustic signal 112A received from the acoustic transmitter 102A, and not the acoustic signal 112B received from the acoustic transmitter 102B. Because the acoustic signal 112A differs from the acoustic signal 102B in some manner, including those described below, the acoustic document feature detector 114 may extract the acoustic signal 112A received at the acoustic receiver 108A and analyze only the acoustic signal 112A to determine the presence of one or more features at the portion 118A of the document 106.

The manner in which the acoustic signals 112A-E differ from one another may vary. In one embodiment, a signal differentiator 120 may modulate each of the acoustic signals 112A-E differently by phase and/or binary code. For example, the acoustic signal 112A may be modulated with a different code than the acoustic signal 112B; thus, the acoustic document feature detector 114 may extract the acoustic signal 102A, and not the acoustic signal 112B, received at the acoustic receiver 108A for further processing based on each acoustic signals characteristic code.

The methods by which the acoustic signals may be modulated are numerous. In one non-limiting example, and with reference to FIG. 4, phase modulation of a signal may be accomplished with a binary code. The phase of a reference signal may be altered depending on the state of each bit of the modulation code. For example, a code bit of zero results in no phase change and a bit of one results in a 180 degree phase shift. In one illustrative embodiment, modulation codes may be selected such that the cross correlation between modulated signals is low (e.g., a set of Gold Codes). This would allow discrimination between different signals arriving at a given receiver simultaneously.

In another embodiment, each of the acoustic signals 102A-E may differ in frequency. In this embodiment, the signal differentiator 120 may cause each of the acoustic transmitters 102A-E to emit a respective acoustic signal 112A-E at different frequencies. In another embodiment, only two or more of the acoustic signals 112A-E may differ from one another such that some of the acoustic signals 112A-E are the same or similar. The acoustic signals 112A-E may be any frequency, including any ultrasonic frequency (e.g., 50 kHz-several megahertz). In addition, the separation between frequencies of the acoustic signals 112A-E or between different pulses emitted by the same acoustic transmitter may be any unit of hertz, including large or small hertz differences. A signal may be modulated in any manner or technique including, but not limited to, analog, digital, spread spectrum, or any other suitable modulation technique. Conversely, a signal may be demodulated using a corresponding technique, such as a correlation or any other suitable technique.

In one embodiment, the acoustic transmitters 102 may emit their acoustic signals 112 simultaneously. In another embodiment, each of the acoustic transmitters 102, or any portion thereof, may emit their respective acoustic signals at a different time or in a staggered manner.

The acoustic document feature detector 114 may include a pulse generator 122 that pulses the acoustic signals 112 at a predetermined pulse frequency as the document 106 moves in the direction of travel 111. The pulse rate frequency may depend on the speed of the document 106. In one non-limiting example, the document 106 may be subjected to a pulse from the acoustic transmitters 102 every 1/10 of an inch, 1/5 of an inch, 1/2 of an inch, etc. By pulsing the acoustic signals 112 toward the document 106 as the document 106 moves past the acoustic transmitters 102, multiple portions along all or a portion of the length of the document 106 may be tested for the presence of one or more features.

The signal differentiator 120 may further differ the acoustic signals 112 emitted by the same acoustic transmitter 102 during each pulse. For example, the acoustic transmitter 102A may emit a different acoustic signal 112A at each pulse as the document 106 moves in the direction of travel 111; the same may apply to the other acoustic transmitters 112. By way of specific illustration, in a non-limiting example in which the acoustic transmitter 102A emits a total of 100 pulses along the length of the document 106 during a single pass of the document 106, each one of the 100 pulses may comprise a different acoustic signal. Furthermore, the acoustic signals may differ in those respects described above, including code modulation or frequency differentiation.

By varying the acoustic signal 112 during each pulse, the acoustic document feature detector 114 may discriminate between acoustic signals received during each pulse. For example, the acoustic signal of interest for purposes of analyzing the portion 118A of the document 106 may be the acoustic signal 112A, but not necessarily the acoustic signals emitted by the acoustic transmitter 102A before or after the acoustic signal 112A is emitted. By differing the acoustic signal for each pulse from the acoustic transmitter 102A, the acoustic document feature detector 114 may differentiate the acoustic signal 112A from the acoustic signals occurring before or after the acoustic signal 112A so that the specific portion 118A of the document 106 is tested for any features; this may be done by extracting the acoustic signal 118A from all of the signals received from the acoustic receiver 108A. It is noted here that acoustic signals occurring before or after the acoustic signal 112A may be received by the acoustic receiver 108A due to a variety of factors, such as reflection off of the surfaces of the acoustic receiver 108A and the second side 110 of the document 106 or other bleed over factors; varying the acoustic signal for each pulse helps to solve this problem by allowing extraction of only the acoustic signal 112A that is emitted through the portion 118A of the document 106. Each of the acoustic transmitters 102 may be pulsed in this manner.

The acoustic document feature detector 114 may also include an acoustic signal processor 124 to determine the presence of a feature on the document 106 using one or more of the acoustic signals 112 received by the acoustic receivers 108. Because the acoustic signals 112 may differ from one another, both in space or time, as described above, the acoustic signal processor 124 may extract any desired acoustic signal from each acoustic receiver 108. For example, the acoustic signal processor 124 may extract the acoustic signal 112A received by the acoustic receiver 108A despite the fact that the acoustic receiver 108A also receives noise from adjacent acoustic transmitters as well as noise from pulses occurring before or after the acoustic signal 112A.

Figure 7:
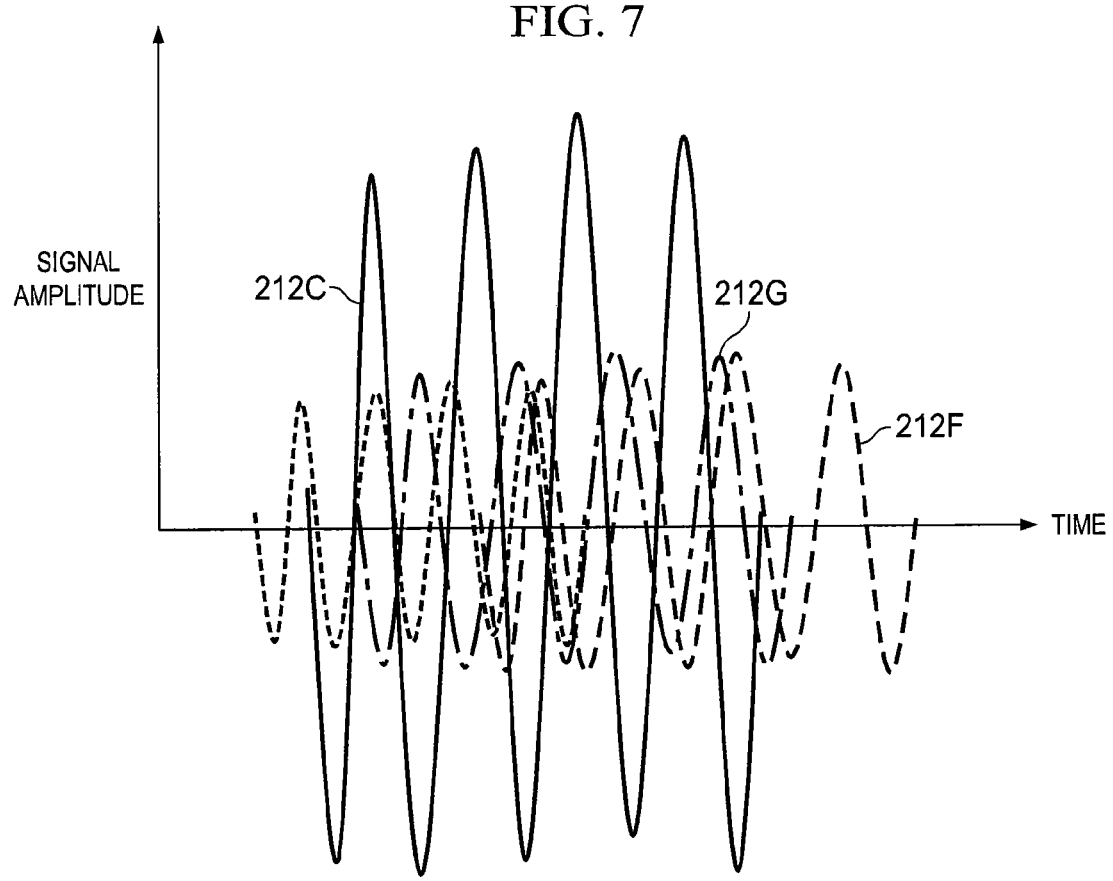
FIG. 7 is a schematic chart plotting waveforms of a set of acoustic signals received at one of the acoustic receivers in FIG. 6 according to an illustrative embodiment.

The acoustic signal processor 124 may process the received acoustic signals 112 in a variety of ways for further analysis. For example, each acoustic signal 112 received at each acoustic receiver 108 may be sampled as a raw signal or waveform, examples of which are shown in FIG. 7 below. These received waveforms may then be processed as individual components to extract a desired acoustic signal(s). It will be appreciated that the acoustic signals 112 may be sampled at any rate, including high rates, so that the received acoustic signals can be subjected to further processing.

Figure 5:
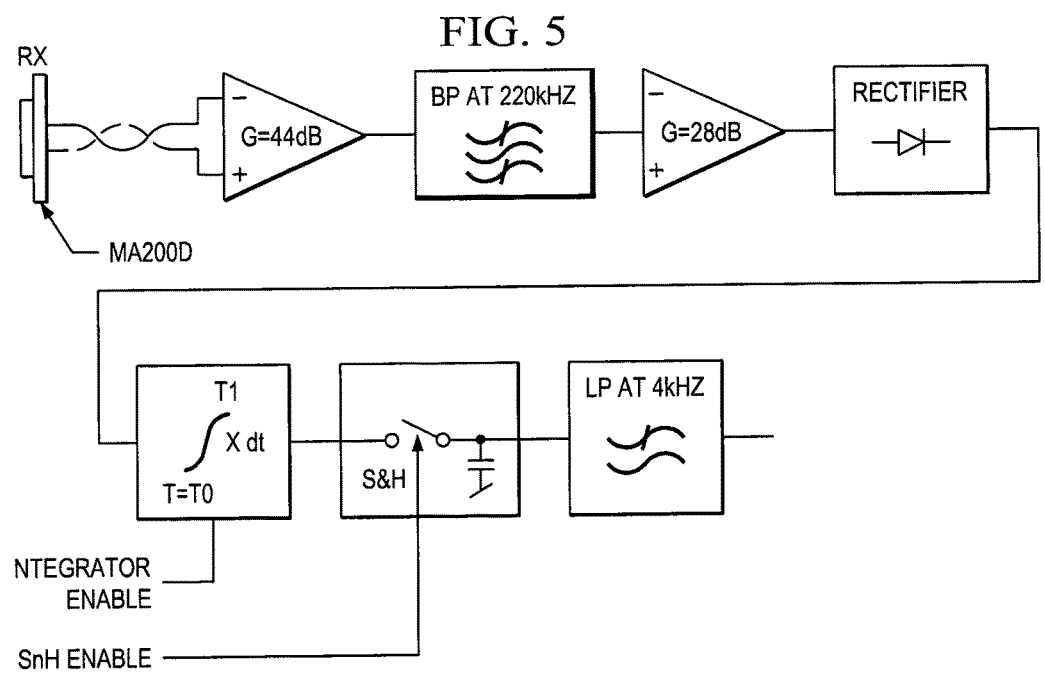
FIG. 5 is a schematic, block diagram illustrating signal processing according to an illustrative embodiment.

In yet another embodiment, the acoustic signal processor 124 may process the received acoustic signals as a sum of energy received over a selected time window; this sum of energy may be all or a portion of the acoustic signals received at any particular acoustic receiver 108. With reference to FIG. 5, the summing of the received energy may be accomplished in the receiver electronics by rectifying and integrating the received signals as shown. The electrical signal from the acoustic receiver may be amplified, band pass filtered, and then passed through a rectifier and integrator. The resulting integrated signal may then be sampled at a relatively low rate to generate the output data.

The acoustic signal processor 124 may then process the extracted signals from each acoustic receiver 108 to determine whether a feature is present at the portions 118A-E of the document 106. For example, a tear or hole may be determined to be at the portion 118A of the document 106 if the acoustic signal 112A is stronger than a predetermined threshold or stronger relative to any of the other signals 112B-E.

It will be appreciated that the illustrative embodiments may alleviate or solve some of the problems associated with acoustic detection or analysis of features in a document. For example, current detectors may suffer from cross-noise from acoustic transmitters being emitted to adjacent acoustic receivers; this may be addressed by the unique acoustic signals 112A-E emitted by each respective acoustic transmitter 102A-E. Varying the acoustic signal for each pulse emitted by each of the acoustic transmitters 102 may also alleviate cross-noise from acoustic pulses occurring at different times. One example of how an acoustic signal from an adjacent pulse may contaminate a current reading is by signal reflection off of one of the receivers 108A and/or the second side 110 of the document 106. The illustrative embodiments may also help to improve signal-to-noise ratio. Such improvement may be especially useful in high noise environments, such as in currency processors.

The illustrative embodiments may be used in a variety of environments in a variety of ways to achieve different results. In one example, the illustrative embodiments may be used to inspect for defects on the document 106. For example, the acoustic document feature detector 114 may be used to detect holes or tears in clear, or vignette, windows. The illustrative embodiments may also be used to detect tape on the document 106; the presence of tape may be indicated, e.g., by more attenuation of the acoustic signal than normal. Illustrative embodiments may also be used to detect tears, including closed or open tears, in the document 106.

In another embodiment, the acoustic document feature detector 114 may be used to detect or analyze features that have characteristic acoustic properties, such as features that have a unique acoustic signal interaction. Features and properties that may be analyzed include, but are not limited to, watermarks that exhibit variations in density of the banknote paper, foils applied to the surface of the banknotes, threads embedded within the paper, or printed ink features such as offset, intaglio, or screen printed design elements. In addition, some types of counterfeit banknotes may be detected such as composed notes or counterfeits manufactured with materials having acoustic properties that differ in some way from those used in genuine notes.

In another embodiment, the acoustic document feature detector 114 may be used to map the physical structure of the document 106 to form an acoustic topology or 2-D or 3-D acoustic mapping of the document 106. The techniques used 2D or 3D mapping may include those used for medical ultrasound imaging where information on the time and phase of acoustic reflections from each interface within the object are processed. In yet another example, the illustrative embodiments may be used to generate an acoustic profile of the document 106 to compare to model acoustic profiles or signatures for authentication or other purposes.

The acoustic transmitters 102 and/or the acoustic receivers 108 may be any type of transmitter or receiver, including, but not limited to, ceramic crystal transmitters or receivers, piezoelectric polymer-based transmitters or receivers, etc.

Figure 6:
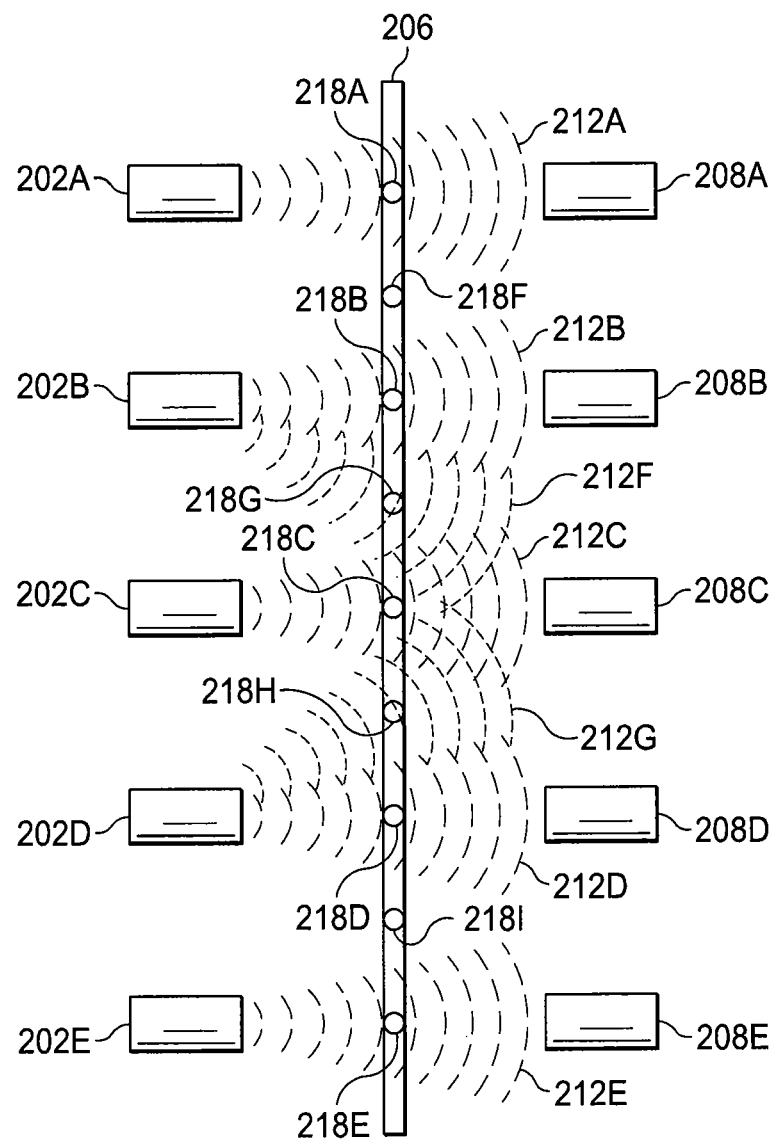
FIG. 6 is a schematic, side view of a set of acoustic transmitters and receivers detecting features of a document along orthogonal and non-orthogonal lines of sight according to an illustrative embodiment.

Referring to FIGS. 6 and 7, an illustrative embodiment of the acoustic document feature detector includes acoustic transmitters 202A-E, and acoustic receivers 208A-E that receive acoustic signals from adjacent, or non-paired, acoustic transmitters to allow for additional portions 218F, 218G, 218H, and 218I to be analyzed for the presence of one or more features. Elements of FIGS. 6 and 7 that are analogous to elements in FIGS. 1 through 3 have been shown by indexing the reference numerals by 100. With particular reference to the acoustic receiver 208C, the acoustic receiver 208C receives the acoustic signals 212C from the acoustic transmitter 202C, the acoustic signal 212F from the acoustic transmitter 202B, and the acoustic signal 212G from the acoustic transmitter 212D. The acoustic signals 212C, 212F, and 212G are also shown in the chart in FIG. 7, which plots the signal amplitude versus time of each of these signals.

The acoustic signals 212F and 212G are propagated along peripheral lines of sight in that they are nonorthogonal to the plane of the document 206. These peripheral lines of sight traverse the document 206 at the portions 218G and 218H of the document 206 to provide additional portions at which the document 206 may be tested for features. Using the remaining acoustic transmitters 202 and acoustic receivers 208, the additional portions 218F-I may also be tested for document features. As a result, a higher resolution may be achieved by the embodiment of FIGS. 6 and 7 than may be achieved using only orthogonal lines of sight between paired acoustic receivers and transmitters.

Referring specifically to FIG. 7, the acoustic signals 212C, 212F, 212G have been sampled as waveforms by the acoustic signal processor, and these waveforms may be processed to extract, analyze, or separate the individual acoustic signal components 212C, 212F, 212G. In the case in which the portion 218G of the document 206 is desired to be analyzed, the acoustic signal processor may extract the acoustic signal waveform 212F to determine whether the portion 218G comprises a feature, such as a defect or tear.

It will be appreciated that while FIG. 6 shows additional portions 218F-I being analyzed along the lateral cross-section of the document 206, peripheral lines of sight may also be utilized longitudinally across the document, such as between the acoustic transmitters and receivers that are in different banks, or columns, shown in FIG. 1. The ability to pair acoustic transmitters and receivers that are both laterally or longitudinally disposed away from one another allows for increased resolution for analysis of the document 206. It is further appreciated that, because the acoustic transmitters 202 may emit different acoustic signals 212 for each pulse, the acoustic signal processor 124 may be able to extract acoustic signals from previous pulses for further processing. Indeed, because the illustrative embodiments use different acoustic signals that vary by acoustic transmitter or pulse, the acoustic document feature detector 114 may process the individual signals individually or in any combination as desired, a result that may be lacking or absent from systems using the same acoustic signals.

Figure 8:
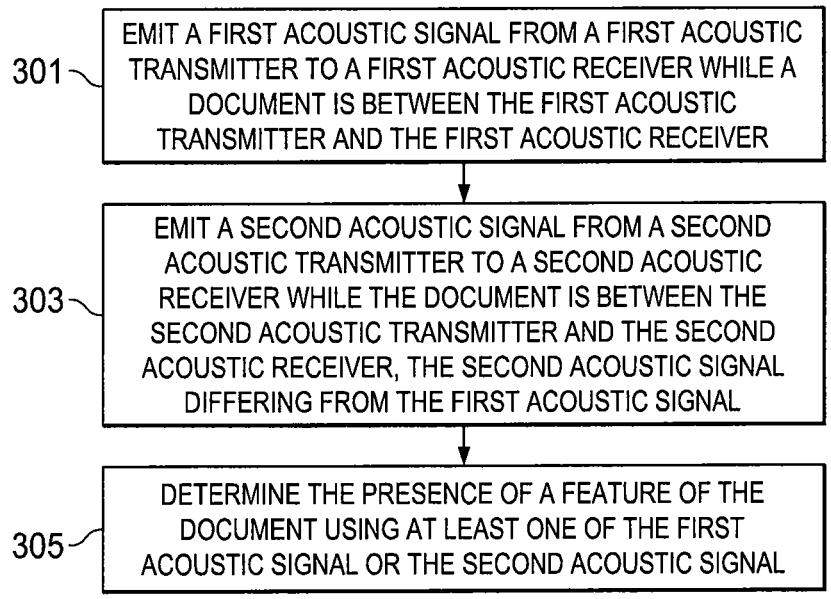
FIG. 8 is a flowchart of a process for detecting a feature of a document using acoustics according to an illustrative embodiment.

Referring to FIG. 8, an illustrative embodiment of a process for detecting a feature of a document using acoustics includes emitting a first acoustic signal from a first acoustic transmitter to a first acoustic receiver while a document is between the first acoustic transmitter and the first acoustic receiver (step 301). The process also includes emitting a second acoustic signal from a second acoustic transmitter to a second acoustic receiver while the document is between the second acoustic transmitter and the second acoustic receiver (step 303). The second acoustic signal may differ from the first acoustic signal. The process may also include determining the presence of a feature of the document using at least one of the first acoustic signal or the second acoustic signal (step 305).

Figure 9:
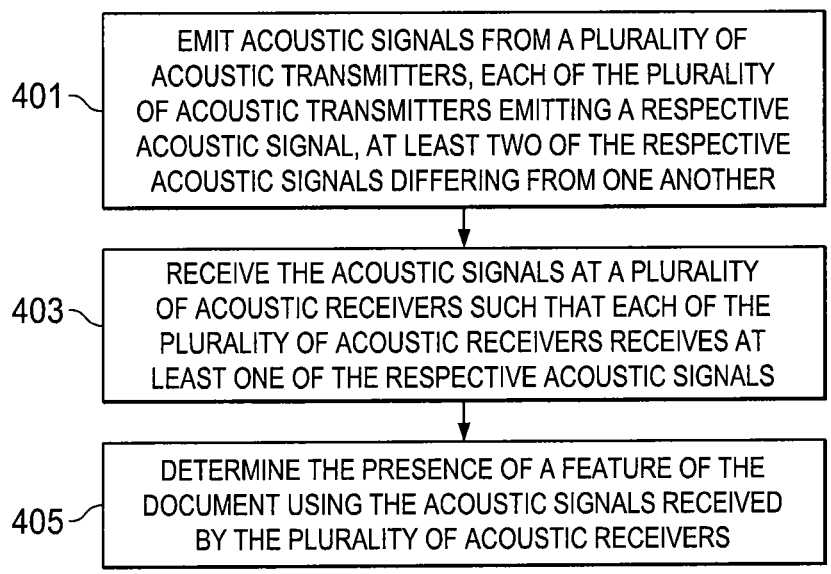
FIG. 9 is a flowchart of a process for detecting a feature of a document using acoustics according to another illustrative embodiment.

Referring to FIG. 9, an illustrative embodiment of a process for detecting a feature of a document using acoustics includes emitting acoustic signals from a plurality of acoustic transmitters (step 401). Each of the plurality of acoustic transmitters may emit a respective acoustic signal. At least two of the respective acoustic signals may differ from one another. The process also includes receiving the acoustic signals at a plurality of acoustic receivers such that each of the plurality of acoustic receivers receives at least one of the respective acoustic signals (step 403). The process also includes determining the presence of a feature of a document using the acoustic signals received by the plurality of acoustic receivers (step 405).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

Referring to FIG. 10, a block diagram of a computing device 502 is shown in which the illustrative embodiments may be implemented. In another embodiment, the acoustic document feature detector 114 described in FIG. 2 may be implemented on the computing device 502. Computer-usable program code or instructions implementing the processes used in the illustrative embodiments may be located on the computing device 502. The computing device 502 includes a communications fabric 503, which provides communications between a processor unit 505, a memory 507, a persistent storage 509, a communications unit 511, an input/output (I/O) unit 513, and a display 515.

The processor unit 505 serves to execute instructions for software that may be loaded into the memory 507. The processor unit 505 may be a set of one or more processors or may be a multi-processor core, depending on the particular implementation. Further, the processor unit 505 may be implemented using one or more heterogeneous processor systems in which a main processor is present with secondary processors on a single chip. As another illustrative example, the processor unit 505 may be a symmetric multi-processor system containing multiple processors of the same type.

The memory 507, in these examples, may be, for example, a random access memory or any other suitable volatile or non-volatile storage device. The persistent storage 509 may take various forms depending on the particular implementation. For example, the persistent storage 509 may contain one or more components or devices. For example, the persistent storage 509 may be a hard drive, a flash memory, a rewritable optical disk, a rewritable magnetic tape, or some combination of the above. The media used by the persistent storage 509 also may be removable. For example, a removable hard drive may be used for the persistent storage 509.

The communications unit 511, in these examples, provides for communications with other data processing systems or communication devices. In these examples, the communications unit 511 may be a network interface card. The communications unit 511 may provide communications through the use of either or both physical and wireless communication links.

The input/output unit 513 allows for the input and output of data with other devices that may be connected to the computing device 502. For example, the input/output unit 513 may provide a connection for user input through a keyboard and mouse. Further, the input/output unit 513 may send output to a processing device. In the case in which the computing device 502 is a cellular phone, the input/output unit 513 may also allow devices to be connected to the cellular phone, such as microphones, headsets, and controllers. The display 515 provides a mechanism to display information to a user, such as a graphical user interface.

Instructions for the operating system and applications or programs are located on the persistent storage 509. These instructions may be loaded into the memory 507 for execution by the processor unit 505. The processes of the different embodiments may be performed by the processor unit 505 using computer-implemented instructions, which may be located in a memory, such as the memory 507. These instructions are referred to as program code, computer-usable program code, or computer-readable program code that may be read and executed by a processor in the processor unit 505. The program code in the different embodiments may be embodied on different physical or tangible computer-readable media, such as the memory 507 or the persistent storage 509.

Program code 517 is located in a functional form on a computer-readable media 519 and may be loaded onto or transferred to the computing device 502 for execution by the processor unit 505. The program code 517 and the computer-readable media 519 form computer program product 521 in these examples. In one embodiment, the computer program product 521 is the acoustic document feature detector 114 described in FIG. 2. In this embodiment, the program code 517 may include computer-usable program code capable of detecting a feature of a document using acoustics includes emitting a first acoustic signal from a first acoustic transmitter to a first acoustic receiver while a document is between the first acoustic transmitter and the first acoustic receiver, and emitting a second acoustic signal from a second acoustic transmitter to a second acoustic receiver while the document is between the second acoustic transmitter and the second acoustic receiver. The second acoustic signal may differ from the first acoustic signal. The program code 517 may also include computer-usable program code capable of determining the presence of a feature of the document using at least one of the first acoustic signal or the second acoustic signal.

In another embodiment, the program code 517 may include computer-usable program code capable of detecting a feature of a document using acoustics includes emitting acoustic signals from a plurality of acoustic transmitters. Each of the plurality of acoustic transmitters emits a respective acoustic signal. At least two of the respective acoustic signals differs from one another. The program code 517 may also include computer-usable program code capable of receiving the acoustic signals at a plurality of acoustic receivers such that each of the plurality of acoustic receivers receives at least one of the respective acoustic signals. The plurality of acoustic receivers receives the acoustic signals while a document is between the plurality of acoustic transmitters and the plurality of acoustic receivers. The program code 517 may also include computer-usable program code capable of determining the presence of a feature of the document using the acoustic signals received by the plurality of acoustic receivers. Any combination of the above-mentioned computer-usable program code may be implemented in the program code 517, and any functions of the illustrative embodiments may be implemented in the program code 517.

In one example, the computer-readable media 519 may be in a tangible form, such as, for example, an optical or magnetic disc that is inserted or placed into a drive or other device that is part of the persistent storage 509 for transfer onto a storage device, such as a hard drive that is part of the persistent storage 509. In a tangible form, the computer-readable media 519 also may take the form of a persistent storage, such as a hard drive or a flash memory that is connected to the computing device 502. The tangible form of the computer-readable media 519 is also referred to as computer recordable storage media.

Alternatively, the program code 517 may be transferred to the computing device 502 from the computer-readable media 519 through a communication link to the communications unit 511 or through a connection to the input/output unit 513. The communication link or the connection may be physical or wireless in the illustrative examples. The computer-readable media 519 also may take the form of non-tangible media, such as communication links or wireless transmissions containing the program code 517. In one embodiment, the program code 517 is delivered to the computing device 502 over the Internet.

The different components illustrated for the computing device 502 are not meant to provide architectural limitations to the manner in which different embodiments may be implemented. The different illustrative embodiments may be implemented in a data processing system including components in addition to or in place of those illustrated for computing device 502. Other components shown in FIG. 10 can be varied from the illustrative examples shown.

As one example, a storage device in the computing device 502 is any hardware apparatus that may store data. The memory 507, the persistent storage 509, and the computer-readable media 519 are examples of storage devices in a tangible form.

In another example, a bus system may be used to implement the communications fabric 503 and may be comprised of one or more buses, such as a system bus or an input/output bus. Of course, the bus system may be implemented using any suitable type of architecture that provides for a transfer of data between different components or devices attached to the bus system. Additionally, the communications unit 511 may include one or more devices used to transmit and receive data, such as a modem or a network adapter. Further, a memory may be, for example, the memory 507 or a cache such as found in an interface and memory controller hub that may be present in the communications fabric 503.

As used herein, including in the claims, the terms first, second, third, etc. . . . used in relation to an element (e.g., first acoustic signal, second acoustic signal, etc.) are for reference or identification purposes only, and these terms, unless otherwise indicated, are not intended to describe or suggest a number, order, source, purpose, or substantive quality for any element for which such a term is used.

Although the illustrative embodiments described herein have been disclosed in the context of certain illustrative, non-limiting embodiments, it should be understood that various changes, substitutions, permutations, and alterations can be made without departing from the scope of the invention as defined by the appended claims. It will be appreciated that any feature that is described in a connection to any one embodiment may also be applicable to any other embodiment.

What is claimed is:

1. A method for detecting a feature of a financial document using acoustics, the method comprising:
    providing a first acoustic transmitter and a first acoustic receiver;
    providing a second acoustic transmitter and second acoustic receiver;
    disposing the financial document between the first acoustic transmitter and the first acoustic receiver and between the second acoustic transmitter and the second acoustic receiver;
    emitting a first acoustic signal from the first acoustic transmitter to the first acoustic receiver while the financial document is between the first acoustic transmitter and the first acoustic receiver;
    emitting a second acoustic signal from the second acoustic transmitter to the second acoustic receiver while the financial document is between the second acoustic transmitter and the second acoustic receiver;
    modulating the first acoustic signal so that the first acoustic signal differs from the second acoustic signal;
    receiving the first acoustic signal and the second acoustic signal at the first acoustic receiver;
    processing acoustic signals received by the first acoustic receiver to extract the first acoustic signal and the second acoustic signal; and
    determining the presence of a feature between the first acoustic transmitter and the first acoustic receiver of the financial document using at least the first acoustic signal and determining the presence of a feature between the second acoustic transmitter and the first acoustic receiver of the financial document using at least the second acoustic signal.

2. The method of claim 1, wherein the first acoustic signal comprises a plurality of acoustic signals emitted from the first acoustic transmitter over time and wherein the method further comprises modulating the first acoustic signal so that each of the plurality of acoustic signals is distinguishable from others of the plurality of acoustic signals.

3. The method of claim 1, wherein the first and second acoustic signals are emitted while the document moves in a direction of travel between the first acoustic transmitter and the first acoustic receiver and between the second acoustic transmitter and the second acoustic receiver.

4. The method of claim 3, further comprising:
    pulsing the first and second acoustic signals from the first and second acoustic transmitters at a predetermined pulsing frequency as the financial document moves in the direction of travel.

5. The method of claim 3, further comprising:
    pulsing a first plurality of acoustic signals from the first acoustic transmitter at a predetermined pulsing frequency while the financial document moves in the direction of travel such that the first acoustic transmitter emits a different one of the first plurality of acoustic signals during each pulse, the first plurality of acoustic signals including the first acoustic signal; and
    pulsing a second plurality of acoustic signals from the second acoustic transmitter at the predetermined pulsing frequency while the financial document moves in the direction of travel such that the second acoustic transmitter emits a different one of the second plurality of acoustic signals during each pulse, the second plurality of acoustic signals including the second acoustic signal.

6. The method of claim 1, wherein the first acoustic signal is modulated with a first code;
    wherein the second acoustic signal is modulated with a second code; and
    wherein the first code is different from the second code.

7. The method of claim 1,
    wherein the first acoustic signal has a first frequency;
    wherein the second acoustic signal has a second frequency; and
    wherein the first frequency is different from the second frequency.

8. The method of claim 1, wherein determining the presence of the feature of the financial document using at least the first acoustic signal and the second acoustic signal comprises determining the presence of at least one of tape, a tear, or a closed tear.

9. The method of claim 1, wherein the financial document is a banknote.

10. A method for detecting a feature of a financial document using acoustics, the method comprising:
    providing a plurality of acoustic transmitters;
    providing a plurality acoustic receivers;
    disposing the financial document between the plurality of acoustic transmitters and the plurality of acoustic receivers;
    emitting acoustic signals from the plurality of acoustic transmitters, each of the plurality of acoustic transmitters emitting a respective acoustic signal, at least two of the respective acoustic signals differing from one another to form a first identifiable acoustic signal and a second identifiable acoustic signal;
    receiving the acoustic signals at the plurality of acoustic receivers such that each of the plurality of acoustic receivers receives at least one of the respective acoustic signals, the plurality of acoustic receivers receiving the acoustic signals while the financial document is between the plurality of acoustic transmitters and the plurality of acoustic receivers, wherein at least one of the plurality of acoustic receivers receives both the first identifiable acoustic signal and the second identifiable acoustic signal; and
    determining the presence of a first feature of the financial document using the first acoustic signal received by the at least one of the plurality of acoustic receivers and determining the presence of a second feature of the financial document using the second acoustic signal received by the at least one of the plurality of acoustic receivers.

11. The method of claim 10, further comprising moving the financial document in a direction of travel between the plurality of acoustic transmitters and the plurality of acoustic receivers.

12. The method of claim 11, wherein the presence of the feature is determined at portions of the financial document located along peripheral lines of sight between at least one of the plurality of acoustic transmitters and at least one of the plurality of acoustic receivers, the peripheral lines of sight non-orthogonal to a plane formed by the financial document.

13. The method of claim 10, wherein each of the respective acoustic signals differs from one another.

14. An apparatus for detecting a feature of a financial document using acoustics, the apparatus comprising:
- a plurality of acoustic transmitters to emit acoustic signals through the financial document, each of the plurality of acoustic transmitters emitting a unique acoustic signal, the financial document having a first side and a second side, the plurality of acoustic transmitters positioned to face the first side of the financial document;
- a plurality of acoustic receivers facing the second side of the financial document, the plurality of acoustic receivers adapted to receive the acoustic signals emitted through the document from the plurality of acoustic transmitters, wherein at least one of the plurality of acoustic receivers is adapted to receive a first acoustic signal from a first acoustic transmitter directly opposed from the at least one of the plurality of acoustic receivers and to receive a second acoustic signal from at least one other of the plurality of acoustic transmitters;
- an acoustic signal processor to determine the presence of a feature of the financial document using the acoustic signals received by the plurality of acoustic receivers and using the first acoustic signal and the second acoustic signal as received by the at least one of the acoustic receivers, wherein a feature between the at least one of the plurality of acoustic receivers and the at least one of the plurality of transmitters is determined by the acoustic signal processor using the first acoustic signal and wherein another feature between the at least one of the plurality of acoustic receivers and the at least one other of the plurality of acoustic transmitters is determined by the acoustic signal processor using the second acoustic signal;
- wherein the feature of the financial document is selected from the group consisting of holes and tears; and
- wherein at least two of the acoustic signals emitted from one of the plurality of acoustic transmitters are unique from one another.

15. The apparatus of claim 14, wherein the financial document passes between the plurality of acoustic transmitters and the plurality of acoustic receivers along a direction of travel, further comprising:
- a pulse generator to pulse the acoustic signals at a predetermined pulse frequency as the financial document moves in the direction of travel.

* * * * *